May 12, 1970 R. A. ERKINS 3,510,910
METHOD FOR MECHANICALLY REMOVING THE GILLS
AND ENTRAILS FROM FISH
Filed April 14, 1967 3 Sheets-Sheet 1
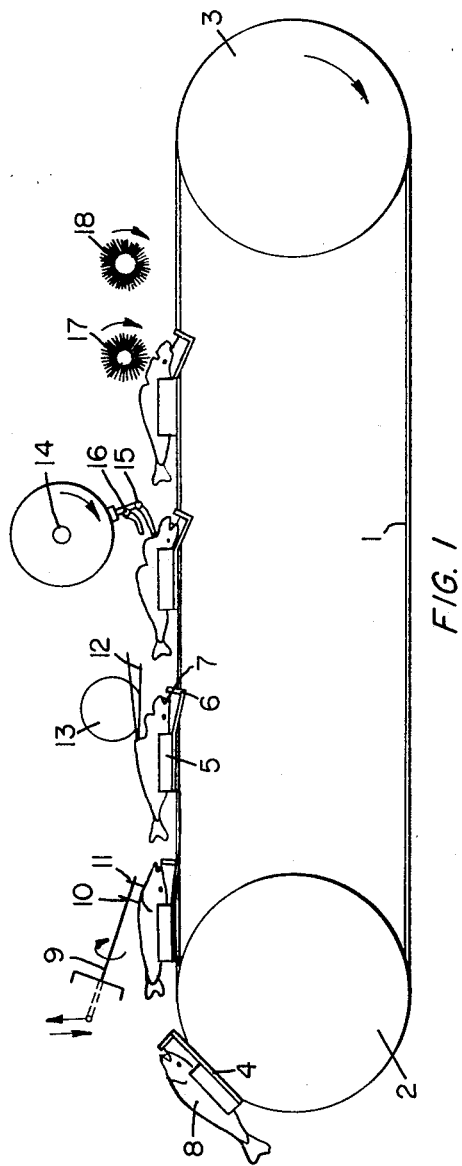
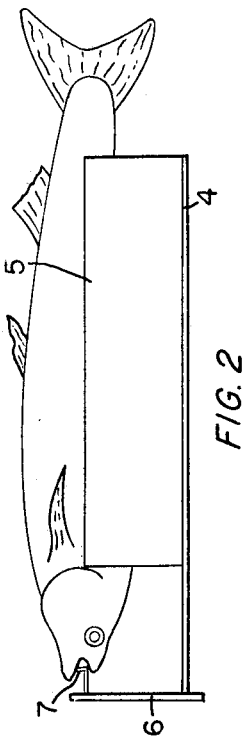
INVENTOR.
R. A. ERKINS INVENTOR
R. A. Erkins
BY
Richards & Geier
ATTORNEYS 3,510,910
Patented May 12, 1970

---

3,510,910
METHOD FOR MECHANICALLY REMOVING THE GILLS AND ENTRAILS FROM FISH
Robert A. Erkins, Buhl, Idaho, assignor to Rudolf Georg Theodor Baader, trading as Fa. Nordischer Maschinenbau Rud. Baader, Lubeck, Germany
Filed Apr. 14, 1967, Ser. No. 630,905
Claims priority, application Germany, May 10, 1966, N 28,510
Int. Cl. A22c 25/14
U.S. Cl. 17—52       4 Claims

ABSTRACT OF THE DISCLOSURE

Method for the removal of gills and entrails of a fish wherein the fish are carried in pockets on a conveyor past a series of mechanisms first to make a pair of transverse cuts on the underside of the fish the first between the mandibular of the lower jaw and the second severing the symphysis from the claviculae, thereafter making a longitudinal cut to open the belly cavity between the second cut and the vent, gripping the bridge of flesh between the transverse cuts and tearing out the gills and entrails by traction. This process avoids removal of the complete lower jaw but does ensure complete removal of gills and throat which is of importance for the processing e.g. of mackerel, trout, etc.

---

This invention relates to a method for removing the gills and entrails from fish.

With herrings the removal of the gills is called "gutting." Various machines for gutting herrings are known. For example a machine is known in which a herring is brought up laterally with its gill cover against the rounded edge of a spike which pierces the gill cavity. During further movement of the herring the gills are gripped and torn out with moving pincers. There is another apparatus in which the gills are torn out by a blunt instrument moving towards the mouth of the fish. There is also a rotary circular cutter for making a throat cut, while the gills are again torn out by a blunt instrument moving towards the mouth of the fish.

These machines only carry out very rough gutting, since the tearing out of the gills badly damages the fish, often tearing the lower jaw completely off. Also, they do not ensure removal of the remains of the gills and throat, so that there is risk of spoilage of the fish. While these disadvantages are not important for pickling gutted herrings, they are very serious in the processing of mackerel, trout or the like.

In seeking a method which would ensure removal of the gills and entrails from fish it was found that the gills could be removed more easily by making a pair of transverse cuts.

According to the present invention, therefore, the method of mechanically removing the gills and entrails from a fish includes the steps of making a pair of spaced generally transverse cuts on the underside of the fish the first of which cuts severs the underside of the fish between the mandibular of the lower jaw and the second of which severs the symphysis from the claviculae, thereafter opening the belly cavity between the second cut and the vent, thereafter gripping the bridge of flesh situated between the first and second cuts and tearing out the gills and entrails by traction. For satisfactory clean removal of the gills the tearing preferably occurs in the plane of symmetry of the fish, for example by traction in the direction of the tail of the fish.

The method may be carried out in various ways. The fish may be laid back downwards with their heads pointing to one side in an intermittently advancing chain conveyor which has pockets to receive the fish. Implements arranged above the pockets then dip into the fish and carry out the processing steps. Alternatively, the fish may be gripped by the tail and drawn continuously past the implements. However, mackerel and trout are hard to grip or hold by the tailfins, so that for conveying these fish through the machine a different method is preferable viz. gripping them by the dental arch of the lower jaw.

According to another aspect of the present invention apparatus for mechanically removing the gills and entrails from a fish includes fish conveyor means for supporting the body of the fish and including one or more head grips for securing the fish by the lower jaw, a pair of spaced cutters which can be raised and lowered for making a pair of spaced generally transverse cuts on the underside of the fish the first of which severs the underside of the fish between the mandibular to the lower jaw and the second of which severs the symphysis from the claviculae, a circular cutter co-operating with spreader means for longitudinally opening the belly cavity, and gripper means for gripping the bridge of flesh situated between the two cuts and tearing out the gills and entrails.

The invention can be carried into practice in various ways but one specific embodiment will now be described by way of example with reference to the accompanying drawings in which:

FIG. 1 is a diagrammatic side elevation of an apparatus according to the present invention;

FIG. 2 is a side elevation of a conveying pocket in the position it occupies at the loading point of the apparatus;

Figure 3:
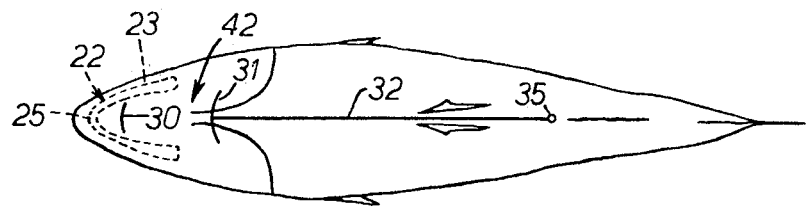
FIG. 3 is an underside view of a fish indicating certain structural parts thereof and also the positions of the cuts made by the apparatus according to the invention.
Figure 4:
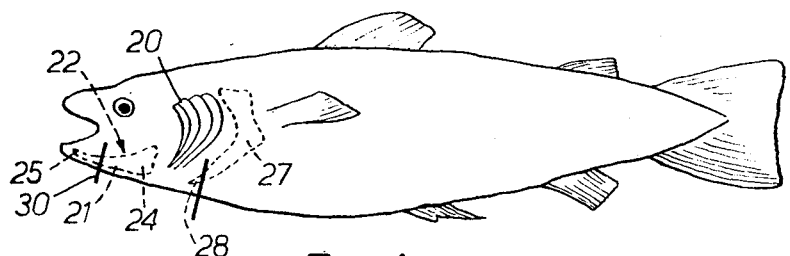
FIG. 4 is a side view of the fish, with the gill cover removed, and also indicating two cuts made by the apparatus.

In order fully to understand the mode of operation of the apparatus shown in FIGS. 1 and 2 reference will first be made to FIGS. 3 to 6. FIGS. 3 and 4 show, in a somewhat diagrammatic manner, certain structural features of a fish before the entrails thereof have been removed. In FIG. 4 the gill cover has been removed to indicate the gills 20 and one side 21 of the lower jaw 22 which is more fully shown in FIG. 3. The lower jaw, or lower maxilla as it is sometimes termed, comprises a pair of side portions or mandibular 23 terminating in enlarged rear portions 24 or articulare. The forward end of the lower jaw, where the two mandibular join, is termed the os-dentale and is indicated at 25 in FIGS. 3, 4 and 5.

To the rear of the gills 20 is situated the collar bone or claviculae 27 which in the side elevation are of generally L-shape and which, adjacent the underside of the fish terminate in a narrow section 28 termed the symphysis.

As will be described, the apparatus shown in FIGS. 1 and 2 is arranged to make three cuts which are generally indicated in FIG. 3 by the reference numerals 30, 31 and 32. The first cut 30, which can be termed the lower jaw cut, and which is also indicated in FIG. 4, takes place on the underside of the fish between the mandibular 23 but not actually severing these structural elements of the skeleton of the fish. This is indicated in FIG. 3 by the fact that the cut 30 is situated between the two mandibular 23 just to the rear of the os-dentale 25.

The second cut 31 takes place to the rear of the lower jaw and the gills and severs the collar bones or claviculae at the position indicated in FIGS. 3 and 4, this cut passing through the claviculae to sever the symphysis 28 from the main body thereof.

The third longitudinal cut 32 extends rearwards from the second cut 31 to the vent 35.

Figure 5:
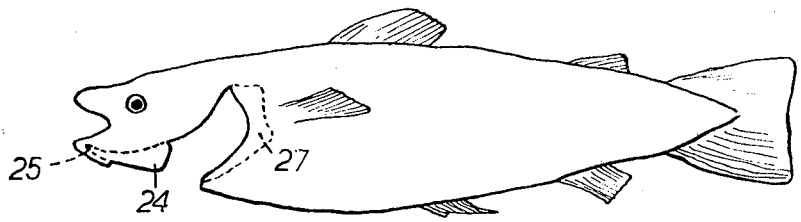
FIG. 5 is a side view of the fish after the entrails have been removed.
Figure 6:
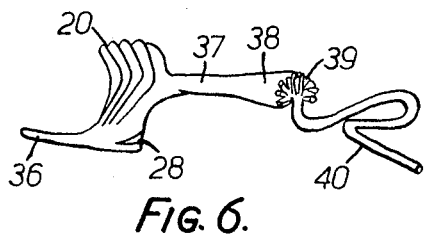
FIG. 6 is a view of the removed entrails.

FIG. 5 illustrates the fish in a diagrammatic manner after the entrails have been removed following the three cuts referred to above, the lower jaw remaining intact. Whilst the main part of the collar bone or claviculae is not removed from the body of the fish, the symphysis 28 thereof remains attached to the removed entrails which are indicated in FIG. 6. The removed entrails comprise the gills 20, the tongue 36, the throat 37, the esophagus 38, the stomach 39 and the small intestine 40. The manner in which the entrails are removed will be discussed in detail with reference to FIGS. 1 and 2 but it is relevant to point out at this juncture that the two cuts 30 and 31 have between them what may be termed "a bridge of flesh." This is indicated at 42 in FIG. 3 and it is this bridge of flesh which is gripped during the removal of the entrails.

Turning now to FIGS. 1 and 2 this illustrates a conveyor 1, for example formed by a chain, running over a pair of rollers 2, 3 and supporting a series of fish conveying pockets 4 which are arranged at fixed intervals each being provided with a head-grip 6, this having a pair of entrainer spikes 7 for receiving a fish 8 and gripping it within the pocket which has a pair of sides 5 for location purposes. The head-grips 6, together with the entrainer spikes 7, are capable of slight bending movement with respect to the remainder of the fish conveyor pockets so that the head of the fish, when in the inverted position in the pocket as shown in FIG. 2, can be bent downwards (i.e. anti-clockwise in FIG. 2) relative to the remainder of the fish.

Situated above the upper run of the conveyor 1 are a succession of mechanisms for carrying out certain operations on the fish as they are conveyed to the right in FIG. 1 by the conveyor. The fish are accordingly passing head-first in an inverted position past the various mechanisms. The first mechanism comprises a cutter shaft 9 which is capable of being raised and lowered and which carries a pair of spaced circular knives or cutters 10 and 11, the cutter 10 being of a larger diameter than the cutter 11. The spacing between the cutters 10 and 11 is so determined in relation to the size of fish being treated as to make the two cuts 31 and 30 respectively referred to above.

Figure 7:
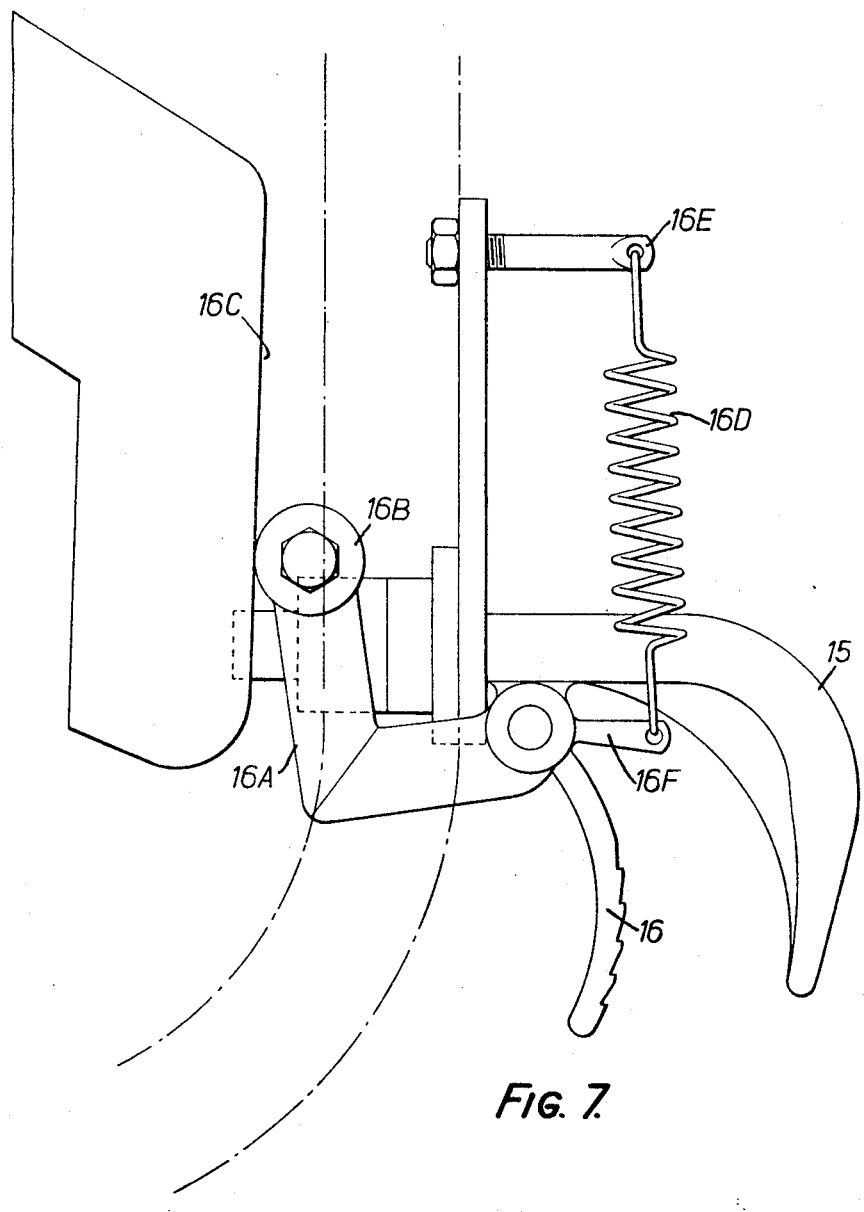
FIG. 7 is a diagrammatic view of part of the apparatus of FIG. 1 and illustrating a gill grip and closeable pincer in more detail.

Following the first mechanism is a second mechanism comprising a stationary spear 12 associated with a third circular cutter 13 which is arranged to make the cut 32 shown in FIG. 3 for opening the belly cavity of the fish. The third mechanism which acts on the fish comprises a gill grip 15 together with a closeable pincer 16 which are both mounted for movement in an arc about a horizontal axis 14. As shown in FIG. 7 the gill grip 15 comprises a curved member adapted to enter the cut 30 as the gill grip is moved downwards in an arc. Pivoted to the gill grip 15 is the closeable pincer 16 which is integral with a crank 16A having a roller 16B at one end which co-operates with a cam surface 16C. A coil spring 16D is provided. This is shown in an extended condition in FIG. 7 with one end connected at 16E and the other end connected to an arm 16F secured to the pincer 16 so as to draw the pincer towards the gill grip 15 in an anti-clockwise direction when the gill grip and pincer together move down to a position in which the roller 16B is clear of the cam surface 16C. In this way immediately after the gill grip enters the cut 30 the pincer 16 will close to grip the bridge of flesh 42 securely and tear this from the fish as it moves to the right in FIG. 1. Conventional cleaning brushes 17 and 18 act on the fish after it has passed the first three mechanisms referred to above, the brush 17 generally cleans the belly cavity and the second brush 18 opens the blood vessels below the backbone.

As has been mentioned above, the head-grips 6 and the entrainer spikes 7 enable the fish to be placed on its back within the fish conveying pockets 5 with the entrainer spikes 7 entering the lower jaw. When the pocket 4 reaches the cutter shaft 9 this shaft is lowered and makes the two cuts 30 and 31 whereafter the head-grip 6 is lowered slightly so that the cut 31 made by the cutter 10 is opened slightly to enable the entry of the spear 12 into the belly cavity, whereafter the circular cutter 13 can slit the belly cavity open over its entire length. Further lowering of the head-grip 6 occurs at the third mechanism thereby to open the cut 30 made by the first cutter 11 in order that the gill-grip 15 can pass through the cut 30. Further movement of the fish will therefore cause the gill-grip to tear out the gills together with the further entrails indicated in FIG. 6. The pincer arm 16 when closed ensures that the gills are correctly gripped and also that the entrails are completely removed from the remainder of the body of the fish. At the far right hand end of the conveyor 1 the fish can be deflected from the fish conveying pockets in a conventional manner.

What I claim as my invention and desire to secure by Letters Patent is:

1. A method of mechanically removing the gills and entrails of a fish, comprising making a cut upon the underside of a fish transversely to its longitudinal direction, said cut extending between the mandibular of the fish, making a second cut upon the underside of the fish transversely to its longitudinal direction and spaced from the first-mentioned cut, the second-mentioned cut severing the symphysis from the caviculae of the fish, whereby a bridge of flesh is formed between the two cuts, making a third cut upon the underside of the fish in the longitudinal direction of the fish from the second-mentioned cut and through the fish belly and then gripping said bridge of flesh and tearing it out along with the gills and entrails of the fish.

2. A method as claimed in claim 1 wherein the head of the fish is bent back towards the back of the neck in one or more stages in order to open one or both of the cuts to facilitate the entry of gripping mechanism for the removal of the gills and entrails.

3. A method as claimed in claim 1 wherein the gills and entrails are torn out by traction in the direction of the tail of the fish.

4. A method of mechanically removing the gills and entrails from a fish including the operations of:
 (a) placing the fish belly upwards on a conveyor and moving the conveyor past a series of mechanisms;
 (b) making a pair of spaced generally transverse cuts with two of said mechanisms on the underside of the fish to form a bridge of flesh therebetween the first of which cuts severes the underside of the fish between the mandibular of the lower jaw and the second of which severes with symphysis from the claviculae;
 (c) opening the belly cavity between the second cut and the vent with a further one of said mechanisms;
 (d) bending the head of the fish with respect to the remainder thereof in order to open at least one of said transverse cuts, said bending taking place before, during or after operation (c), and
 (e) gripping the bridge of flesh by another one of said mechanisms and tearing out the gills and entrails by traction.

References Cited

FOREIGN PATENTS 98,679  9/1961  Norway.

LUCIE H. LAUDENSLAGER, Primary Examiner